(12) United States Patent
Scranton, Jr. et al.

(10) Patent No.: US 6,664,210 B1
(45) Date of Patent: *Dec. 16, 2003

(54) COMPRESSED METAL OXIDE PRODUCT

(75) Inventors: Delbert C. Scranton, Jr., Chesterfield, MO (US); Alvin Samuels, New Orleans, LA (US); Alan D. Johnson, Collinsville, IL (US)

(73) Assignee: M-I LLC, Chesterfield, MO (US)

( * ) Notice: Subject to any disclaimer, the term of this patent is extended or adjusted under 35 U.S.C. 154(b) by 136 days.

This patent is subject to a terminal disclaimer.

(21) Appl. No.: 09/663,966

(22) Filed: Sep. 19, 2000

Related U.S. Application Data

(63) Continuation-in-part of application No. 09/379,529, filed on Aug. 24, 1999, now Pat. No. 6,228,802.

(51) Int. Cl.⁷ .................................................. B01J 20/24
(52) U.S. Cl. ........................ 502/401; 502/338; 502/404
(58) Field of Search .............................. 502/9, 84, 400, 502/406, 253, 259, 329, 335, 338, 343, 401, 402, 404; 585/448, 470, 823, 830; 208/62; 423/138, 244.02, 244.06, 230, 141; 95/135–137; 264/430, 628, 621; 23/313 P

(56) References Cited

U.S. PATENT DOCUMENTS

| | | | | |
|---|---|---|---|---|
| 4,105,590 | A | | 8/1978 | Koberstein et al. ......... 252/464 |
| 4,664,903 | A | | 5/1987 | Becker et al. ............... 423/573 |
| 4,732,888 | A | | 3/1988 | Jha et al. ..................... 502/406 |
| 5,167,919 | A | | 12/1992 | Wagner ....................... 420/582 |
| 5,393,724 | A | | 2/1995 | Okajima et al. ............. 502/402 |
| 5,670,445 | A | * | 9/1997 | Kitahara et al. ............. 502/406 |
| 5,801,115 | A | | 9/1998 | Albers et al. ................ 502/341 |
| 5,914,288 | A | | 6/1999 | Turk et al. ..................... 502/38 |
| 5,972,835 | A | | 10/1999 | Gupta .......................... 502/439 |
| 5,997,829 | A | | 12/1999 | Sekine et al. ................ 423/210 |
| 6,338,794 | B1 | * | 1/2002 | Khare .......................... 208/247 |
| 2002/0052291 | A1 | * | 5/2002 | Siriwardane ................. 502/244 |

* cited by examiner

*Primary Examiner*—Steven Bos
*Assistant Examiner*—Anthony Kuhar
(74) *Attorney, Agent, or Firm*—Thomson Coburn LLP

(57) ABSTRACT

The present invention relates to a bound metal oxide particle comprised of metal oxide and a binder, with the binder preferably being a starch solution. The present invention also relates to a method for forming a bound metal oxide particle, with the preferred method including extruding and pelletizing a metal oxide and binder composition to form pelletized metal oxide particles.

21 Claims, 7 Drawing Sheets

|  | Initial | | | 6-Hours | | | 14-Hours | | | 22-Hours | | |
|---|---|---|---|---|---|---|---|---|---|---|---|---|
|  | Inlet | Outlet | % Removal | Inlet | Outlet | % Removal | Inlet | Outlet | % Removal | Inlet | Outlet | % Removal |
| COS | 5.2 | 4.0 | 23.1 | 5.4 | 4.3 | 20.7 | 4.9 | 3.8 | 22.9 | 5.1 | 4.0 | 22.6 |
| $H_2S$ | 4.7 | 0.0 | 100.0 | 4.8 | 0.0 | 100.0 | 4.4 | 0.0 | 100.0 | 4.0 | 0.0 | 100.0 |
| $CS_2$ | 1.9 | 0.5 | 72.9 | 1.8 | 0.6 | 64.4 | 1.5 | 0.3 | 79.2 | 1.4 | 0.2 | 84.5 |
| DMS | 1.6 | 0.9 | 44.4 | 1.8 | 1.0 | 43.2 | 1.7 | 0.9 | 47.7 | 1.6 | 1.1 | 35.0 |
| MeSH | 6.1 | 1.2 | 80.9 | 6.0 | 0.0 | 100.0 | 5.5 | 0.2 | 97.1 | 5.3 | 0.0 | 100.0 |
| EtSH | 1.8 | 0.5 | 74.6 | 1.7 | 0.0 | 100.0 | 1.5 | 0.0 | 100.0 | 1.3 | 0.0 | 100.0 |
| PrSH | 0.3 | 0.0 | 100.0 | 0.3 | 0.0 | 100.0 | 0.2 | 0.0 | 100.0 | 0.2 | 0.0 | 100.0 |
| TOTAL | 21.6 | 7.0 | 67.7 | 21.7 | 5.9 | 72.7 | 19.7 | 5.2 | 73.8 | 18.9 | 5.3 | 71.9 |
| COPPER STRIP | 2E | 1B |  | 2E | 1B |  | 2D | 1A |  | 2E | 1A |  |

Fig. 1

|  | Initial | | | 6-Hours | | | 14-Hours | | | 22-Hours | | |
|---|---|---|---|---|---|---|---|---|---|---|---|---|
|  | Inlet | Outlet | % Removal | Inlet | Outlet | % Removal | Inlet | Outlet | % Removal | Inlet | Outlet | % Removal |
| COS | 4.8 | 4.1 | 13.8 | 5.0 | 4.6 | 7.67 | 4.8 | 3.9 | 19.2 | 4.6 | 4.1 | 10.2 |
| $H_2S$ | 6.4 | 0.0 | 100.0 | 6.9 | 0.0 | 100.0 | 6.2 | 0.0 | 100.0 | 5.9 | 0.0 | 100.0 |
| $CS_2$ | 2.4 | 1.0 | 60.2 | 2.2 | 0.4 | 80.1 | 2.0 | 0.7 | 63.1 | 1.9 | 0.6 | 68.8 |
| DMS | 1.9 | 0.5 | 71.3 | 1.6 | 0.4 | 76.2 | 1.4 | 0.7 | 51.4 | 1.7 | 0.9 | 47.4 |
| MeSH | 5.8 | 0.3 | 95.0 | 5.2 | 0.0 | 100.0 | 5.4 | 0.0 | 100.0 | 5.0 | 0.0 | 100.0 |
| EtSH | 2.2 | 0.7 | 69.0 | 1.9 | 0.0 | 100.0 | 1.8 | 0.0 | 100.0 | 1.8 | 0.0 | 100.0 |
| PrSH | 0.5 | 0.2 | 68.1 | 0.5 | 0.0 | 100.0 | 0.4 | 0.0 | 100.0 | 0.3 | 0.0 | 100.0 |
| TOTAL | 23.8 | 6.7 | 71.7 | 23.3 | 5.5 | 76.6 | 21.9 | 5.3 | 75.8 | 21.1 | 5.6 | 73.4 |
| COPPER STRIP | 3B | 1B |  | 3B | 1B |  | 3A | 1A |  | 3A | 1A |  |

Fig. 2

COMPRESSED METAL OXIDE PRODUCT

This application is a continuation-in-part of U.S. patent application Ser. No. 09/379,529, now U.S. Pat. No. 6,228,802, filed Aug. 24, 1999.

FIELD OF INVENTION

The present invention relates to a bound or compressed metal oxide particle for use in removing contaminants, including sulfur compounds, from fluids, and a method for making such compressed metal oxide composition. More preferably, the present invention relates to an extruded pelletized iron oxide composition, with the binder being a cellulose composition.

BACKGROUND OF INVENTION

It is well known to use metal oxides, particularly iron oxide ($Fe_xO_y$) in a reactor bed to remove contaminants, typically sulfur compounds, especially hydrogen sulfide ($H_2S$), from fluids, typically gas streams. Sulfur compounds are removed from fluids because they are known contaminants, which potentially make gas streams or other fluids unsalable. Gas that contains too much sulfur is known as sour gas. As such, in the gas industry, as well as related industries, it is considered necessary to remove sulfur compounds from fluids, including gas. Note that these fluids are typically devoid of oxygen. (It is known oxygen can increase reactivity between a metal oxide composition and contaminants.) For this reason, there is a need for products that remove sulfur compounds efficiently and cost effectively from fluids. It is further desired to have a method or composition that does not require the inclusion of activating agents, such as oxygen. Unfortunately, most commercially available iron oxide compositions (the most frequently used metal oxide material in removing sulfur) which operate at ambient conditions and are generally non-activated, hold an amount of sulfur equal to at most 20% by weight of the total iron oxide composition. More typically, iron oxide material (like that compressed in the present process) will hold on average 0.12 lbs of $H_2S$/lb of iron oxide. (The percent held is dependent, in part, on the particular species of iron oxide used). Increased $H_2S$ absorption capacity for iron oxide compositions, above 20%, typically require the addition of a caustic or oxygen to the feed gas, which is dangerous and potentially difficult, especially at high pressures. This is problematic because approximately 80% of the total metal oxide product is unused. For this reason, frequent replacement of the metal oxide is required. Consequently, it is desired to increase the percent by weight of sulfur held by the total metal oxide product.

Sulfur removal on a level that treats up to millions of cubic feet of gas per day or on an industrial scale, typically requires the use of large reactor beds filled with the iron oxide media or product. Typically, this media is comprised of iron oxide and a carrier such as montmorillonite or wood chips. In order to eliminate frequent change-outs, that is the replacement of spent metal oxide media (media that no longer has suitable reactivity with sulfur) with new metal oxide media, large or numerous reactor beds are used. These reactor beds will either be very tall, 10 feet or higher, or multiple reactors will be lined up in succession so that a plurality of reactor beds will be used. If the reactor beds are too small or few, the metal oxide will be spent too fast. This is because when treating large volumes of gas or other fluids, the metal oxide found in the metal oxide media will be rapidly reacted. In order to have a sufficient bed life so that frequent changings of the metal or iron oxide media is not required, large amounts of metal oxide must be used. This is disadvantageous for a couple of reasons. First, the amount of sulfur held by the metal or iron oxide composition is low relative to the total weight of the product used. In order to increase efficiency, it is desired to have a product that holds a greater percentage of reacted sulfur per pound of total product. Secondly, the amount of area required to remove sulfur can increase costs. It is desired to have the option to decrease the total area required to remove $H_2S$. In other words, it is desired to hold a greater amount of sulfur with a decreased amount of metal oxide composition.

One way to increase the amount of sulfur held in a reactor vessel is to pelletize or compress the metal oxide. The amount of sulfur held by the metal oxide composition is increased because there is more available metal oxide in the vessel. Normally, metal oxide is placed on a carrier, with the carrier comprising approximately 80% by weight of the metal oxide composition. Conversely, a pellet is typically comprised of an amount of binder equal to from about 1% to about 20% by weight of the pelletized mixture. As can be seen, the amount of metal oxide is significantly increased. The binders that have been used to form the pelletized iron oxide particles include cement, bentonite, and similar compositions, especially inorganic compositions. The pelletized particles made from these binders, however, have suffered from a problem in that it appears that the efficiencies have been lowered and that the reactivity of the metal oxides has been decreased. In particular, the amount of sulfur held is not significantly increased over the amount of sulfur held by the same species of metal oxide particle on a carrier. For this reason, prior attempts to pelletize metal oxide have been considered unsuccessful because of inadequate sulfur reactivity, in particular, holding capacity. Thus, it is necessary to find a binder that allows for sufficient binding of the metal or iron oxide particles without lowering the reactivity or efficiency with which the sulfur compounds are removed. More particularly, it is necessary to find a binder that permits the metal oxide to hold a greater amount of sulfur, in particular, $H_2S$, without the presence of a caustic or the addition of oxygen in some form.

As stated, it has been known to pelletize metal oxides for use in removing sulfur compounds from fluids. In particular, U.S. Pat. No. 4,732,888, invented by Jha et al. discloses a zinc ferrite pellet for use in hot coal gas desulfurization. The patent discloses a composition comprised of zinc and iron oxide bound together with inorganic and organic binders, and a small amount of activator. Inorganic binders include bentonite, kaolin, and Portland Cement. The organic binders include starch, methylcellulose, and molasses. The pellets have a very specific product design because they are used in beds having temperatures of at least 650° C. Because of the high temperatures, the organic binders dissipate leaving pellets that are fragmented and porous. Thus, the organic binders are included for the specific purpose of holding the pellets together, initially, and then dissipating so as to create greater porosity. While this design is outstanding for use in high temperature coal desulfurization processes, it does not provide for sufficient removal at ambient conditions. As implied, it has been observed that inorganic binders decrease the amount of sulfur removed by pelletized metal oxides. As a result, insufficient removal of sulfur will likely occur at ambient or near ambient conditions when inorganic binders are used to bind the pellets together. It should also be noted, that it has previously been believed that organic binders were unacceptable for forming pellets used at ambient conditions, because the organic binders generally do not provide for a pellet that has sufficient crush strength, or there is insufficient reactivity, or the use of the binders creates a pellet that is cost prohibitive.

SUMMARY OF INVENTION

The present invention relates to bound or compressed metal oxide particles used in the removal of contaminants, preferably sulfur compounds, from fluids and methods related thereto. The compressed metal oxide particle will be comprised of an amount of metal oxide equal to at least 80% by weight of the compressed metal oxide particle. Additionally, the compressed metal oxide particles have a crush strength equal to at least 1.0 kg and, more preferably, a crush strength equal to at least 3.5 kg. The compressed metal oxide will also retain an average amount of sulfur equal to at least 10% by weight of the compressed metal oxide particle and, more preferably, an amount of sulfur equal to at least 30% by weight of the compressed metal oxide particle. Importantly, the compressed metal oxide particle will hold a greater amount of sulfur than if the particular metal oxide species used to form the compressed metal oxide particle was used in association with a carrier. Generally, the compressed metal oxide particle will be able to hold an amount of hydrogen sulfide ($H_2S$) equal to at least 0.27 per pound of metal oxide particle. The compressed metal oxide particle is further advantageous because it will sufficiently remove sulfur at temperatures of less than 150° C. and, even more advantageously, at ambient conditions.

The compressed metal oxide particle will be comprised of an amount of metal oxide, preferably in powder form or having a small particle size, and a binder. The metal oxide will have a particle size ranging between about 0.1 microns and about 100 microns, which means that the metal oxide will be similar to dust, also known as fines. Any of a variety of metal oxides which are reactive with sulfur compounds may be used to form the bound metal oxide particles. Most preferably, the metal oxide will be of the formula $Me_xO_y$, with Me selected from the group consisting of row 4, 5, 6, and 7 metals, with x equal to between 1 and 3, and y equal to between 1 and 4. It is more preferred if the metal oxide is an iron or zinc oxide composition, as these metal oxides have been known to readily react with sulfur compounds. In particular, iron oxide of the formula $Fe_aO_b$ will be preferred with a equal to between 1 and 3, and b equal to between 1 and 4. As such, iron oxide of the formula $Fe_3O_4$ is most preferred.

Any of a variety of organic binders may be used to hold the metal oxide particles together to thereby form the compressed or bound metal oxide particle. The binder selected must permit the metal oxide to be reactive with the sulfur compounds, and must also provide for a bound metal oxide particle having sufficient crush strength. Crush strength will be equal to at least 1.0 kg, as mentioned above, and is more preferably equal to at least 3.5 kg. As such, it has been determined that suitable binders, which provide for a bound metal oxide particle complying with the present invention are starch compositions and/or cellulose compositions. Substantially hydrophobic binders are preferred, with the cellulose composition being the most preferred. Additionally, lignin, bentonite, and lignosulfonate may also be used as binders. The binder can be added to the metal oxide in an amount equal to between 0.5% and 20% by weight, and more preferably in an amount equal to between 0.5% and 5% by weight The method of the present invention involves combining the cellulose, which is the preferred binder, and the metal oxide particles and thoroughly mixing the two constituents. Once the two constituents are mixed, it is necessary to compress the composition so as to form the bound metal oxide particles. The techniques used to compress the constituents to form the bound metal oxide particles can be any of a variety of techniques or devices. Any compression device or method can be used as long as the bound metal oxide particles are suitably formed and have sufficient crush strength. It is most preferred, however, to pass the constituents through an extruder to form an extruded metal oxide composition. This has been found to produce pellets or particles which have sufficient crush strength and reactivity with contaminants, especially sulfur compounds. Additionally, once the material has been extruded, it is preferred to pelletize the material so as to form pelletized, extruded metal oxide particles. Any of a variety of extrusion devices may be used as long as the particles or pellets will have a diameter ranging between 3 mm and 20 mm, and a length ranging between 3 mm and 20 mm. More preferably, the pellets will have a diameter of approximately 3 mm to 6 mm, and a length of about 6 mm.

The present invention is advantageous for a number of reasons. In particular, the bound metal oxide particles allow for a product that can be used in a reactor bed, whereby the product reacts with a greater amount of sulfur so that a greater amount of sulfur is found in the reactor bed. This is desirable because a lesser amount of overall space can be used and fewer reactor vessel change-outs are required. The present invention is also advantageous because it demonstrates that a pelletized and extruded metal oxide particle can be formed that has sufficient reactivity with sulfur. This means that the particles are suitable for commercial use unlike many other known pelletized metal oxide compositions.

BRIEF DESCRIPTION OF THE DRAWINGS

FIG. 1 describes removal of various sulfur compounds from a propane liquid stream using pelletized iron oxide with measurements taken, initially, at 6 hours, 14 hours, and 22 hours;

FIG. 2 describes the same thing as FIG. 1, except a zinc oxide composition was used to remove the sulfur compounds;

DETAILED DESCRIPTION

Figure 3:
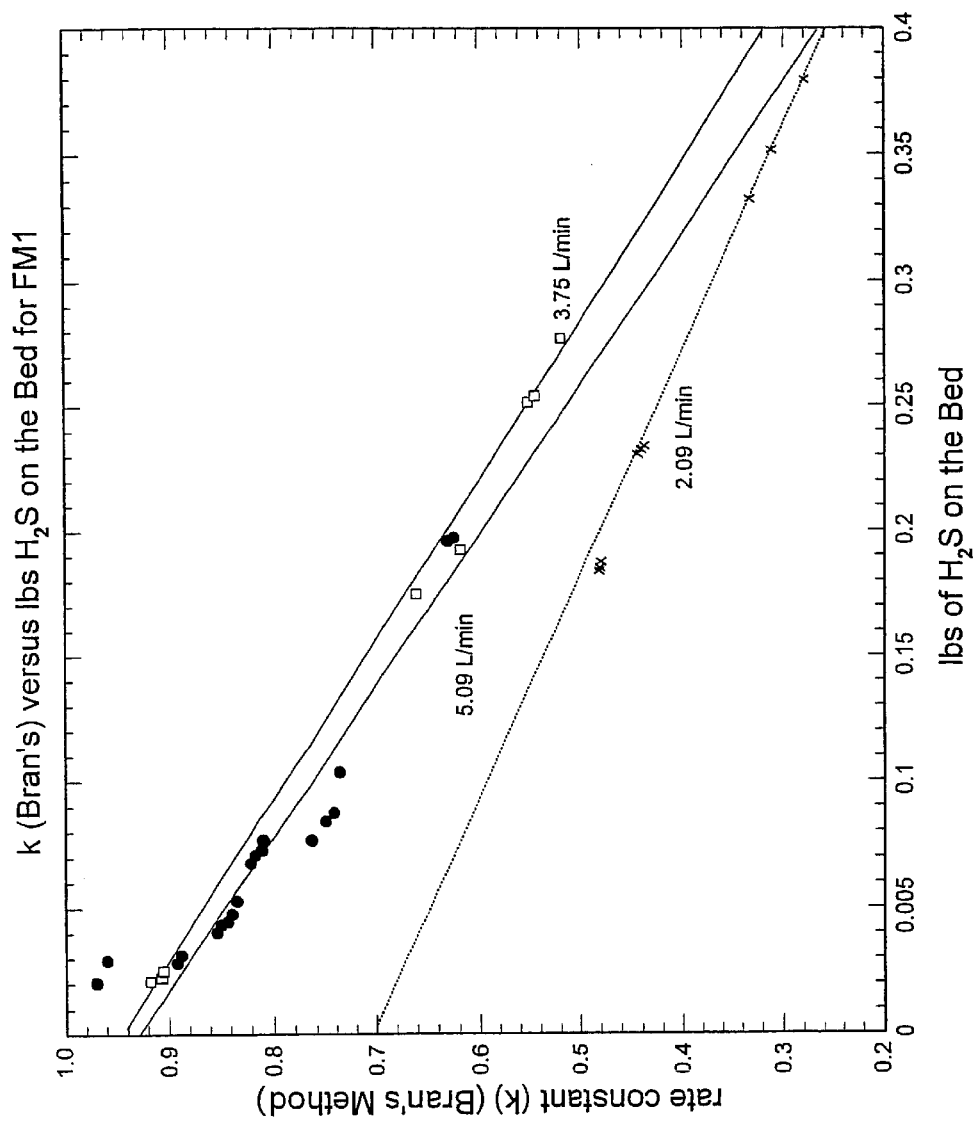
FIG. 3 is a graph which relates three flow rates to a k (Bran's) constant versus lbs. of $H_2S$ on an oxide bed.

The present invention relates to a bound or compressed metal oxide particle, a method for making such particle, and a method of using such particle to remove contaminants, preferably sulfur compounds, from fluids. The bound metal oxide particle is preferably an extruded pelletized iron oxide particle that is well suited for removing sulfur compounds, such as $H_2S$, from fluids. The pelletized extruded metal oxide particle advantageously retains a greater amount of the sulfur compounds than other metal oxide compositions. The pelletized extruded metal oxide can retain an average amount of sulfur equal to at least 10%, and preferably 30%, by weight of the pelletized extruded metal oxide particle. Preferably, an extruder is used to form the pelletized extruded metal oxide particle, which is comprised of at least one metal oxide and a binder. The preferred binder is a cellulose composition.

The method is initiated by mixing an amount of metal oxide with an amount of binder to form a homogenous metal oxide blend. Any method of mixing the two constituents can be used so long as the constituents are thoroughly mixed and a homogenous binder, metal oxide blend is formed. It is preferred to add the binder to the metal oxide in an amount equal to from about 0.5% to about 20% by weight of the metal oxide. More preferably, the cellulose binder is added to the metal oxide in an amount equal to between 0.5% and 5% by weight of the metal oxide.

Any of a variety of metal oxides can be used in the present invention, with the metal oxides defined by the formula $Me_xO_y$ whereby Me is selected from the group consisting of row 4, 5, 6, and 7 metals, with x equal to between 1 and 3 and y equal to between 1 and 4. More preferably, the metal oxide is selected from the group consisting of $Fe_aO_b$, ZnO, and combinations thereof, with a being equal to between 1 and 3 and b equal to between 1 and 4. Also, hydroxides of the metal oxide may be used. Iron oxide compositions ($Fe_aO_b$) are the most preferred metal oxides for use in the present invention. Preferably, the bound metal oxide particle will be comprised of $Fe_3O_4$. This composition is commonly sold under the name "black iron oxide" and as such, black iron oxides are preferred for use in the present invention.

The metal oxide will have a particle size ranging between about 0.1 microns and about 100 microns and, more preferably, between about 1.5 microns and 50 microns. As such, the unprocessed or raw metal oxide used to form the bound metal oxide product will be fines, or in powder form. Thus, a uniform body or bound particle will be formed from a granular or fine material.

Most preferably, the iron oxide will be ferrimagnetic. It is believed that the iron oxide particles that provide the best results are not only ferrimagnetic, but have a particle size ranging between about 0.1 microns and about 100 microns. More preferably, the particle size will range between about 1.5 microns and about 50 microns. Also, the particles are preferably porous so that they are believed to have at least 25× more surface area than other non-porous particles such as solid particles of the same size. These are believed to be desired characteristics.

The binder that is mixed with the metal oxide should be of a sufficient binding strength so as to form a metal oxide particle that will have a crush strength of at least 1.0 Kg, and preferably 3.5 Kg, as measured by a Kohl hardness tester. Not only should the binder impart a sufficient crush strength, but it should be such that it does not impact the reactivity of the metal oxide particles with sulfur. It is hypothesized that the binder should be such that it allows for the bound metal oxide particles to have some porosity or transfer capability, which allows reasonable use of the interior of a particle. Regardless, the binder should allow the pelletized metal oxide to retain an amount of sulfur equal to at least 10% by weight of the pellet and preferably at least 30% by weight of the pellet. Any of a variety of binders fitting this description can be used; however, it is most preferred to use an organic binder that is more preferably a cellulose composition. It is preferred if the cellulose present in the metal oxide particle composition is equal to or less than 3%. Besides starch, lignin, bentonite, and lignosulfonate can be used as a binder.

The binder should be such that it does not readily absorb water and is relatively hydrophobic. It is necessary to prevent substantial water absorption because the pellets are typically used in a moist environment. If water is absorbed, the pellets can potentially degrade, as the binder no longer works. Thus, a binder that does not degrade as a result of water absorption is preferred.

The most preferred binder is a cellulose or a mineral modified cellulose, a binder comprised of nearly 100% cellulose is most preferred. Preferably, the binder absorbs less than 60% by weight water. An aspect ratio of between 6 and 7 is preferred. A density of greater than 70 gm/l is preferred. The particle size of the binder should range between 32 microns and 200 microns. An example of a suitable commercially available binder is TECHNOCELL™ 202, manufactured by the Cellulose Filler Factory Corp., Chestertown, Md.

In addition to the metal oxide used to form the bound metal oxide particle, an amount of activator of metal oxide can be added to the mixture. The addition of the activator is intended to increase the reactivity of the bound metal oxide particle and, in particular, will cause the particle to more readily react with sulfur compounds. Among the available activators are copper oxide, silver oxide, gold oxide, platinum oxide, cadmium oxide, nickel oxide, palladium oxide, lead oxide, mercury oxide, tin oxide, cobalt oxide, aluminum oxide, manganese oxide, and combinations thereof. It is most preferred, however, to use a copper oxide, as this has been known to most readily increase the reactivity of a metal oxide without the ready formation of hazardous compounds, as specified by the Environmental Protection Agency. The activator should be added in an amount equal to from about 0.5% to about 5% by weight of the metal oxide composition used to form the bound metal oxide particle.

Once the metal oxide composition has been mixed, the metal oxide composition is compressed to form the bound metal oxide particle. Compression can be achieved in a variety of ways as long as bound particles are formed. It is preferred to pass the composition through an extruder device or a similar device so as to form an extruded metal oxide composition. Any of a variety of extruders and methods can be used for forming the extruded metal oxide so long as sufficient reactivity with sulfur is maintained and the particles produced therefrom have sufficient crush strength. It is preferred if the die on the extruder has a diameter ranging between 3 millimeters (mm) and 20 mm, and a dieway length of at least 15 mm. Generally, the length will be 5× the diameter. It is believed that these die conditions will result in a particle having sufficient reactivity and crush strength. It is more preferred for the die length to be at least 30 mm long and 6 mm diameter.

Once the extruded metal oxide passes through the die, it is preferred to chop or cut the extruded material into particles to form pellets. Standard methods in the industry for forming pellets out of extruded material can be used. As such, the preferred pelletized, extruded metal oxide material will have a crush strength of 3.5 Kg, a diameter ranging between about 3 mm and about 8 mm, and a length ranging between 15 mm and 40 mm. Note that the crush strength of the pellets will be dependent upon a variety of factors including moisture content, starch concentration, die diameter, and die length.

Besides extruding the metal oxide and the binder, other compressed forms may be used. Among the available compressed forms are pellets, tablets, pestilles, ribbed, ribbed rings, rings, spheres, and extrusions.

Any method for compressing the metal oxide together so that a carrier is not required and it can be used in a reaction bed can be used. It is further desired to form pellets instead of simply adding metal oxide powder to a reaction vessel because for sufficient reactivity to occur, there must be space within the reactor to allow the fluid to pass. Powder would not allow for a sufficient flow rate.

After the pellets are formed, it is necessary to dry the pellets so as to reduce moisture. Any process for drying can be used so long as the pellets have a total water content of less than 10% by weight, and, more preferably, less than 3% by weight. The temperature used to dry the pellets should be any temperature that will not breakdown or incinerate the binder and which does not oxidize the metal oxide. Preferably, the temperature will be 150° C. or less and, more preferably, the temperature will be 90° C. or less. It is necessary to dry the pellets to maximize the crush strength.

Dryers that may be used include a rotary dryer or belt dryer. The rotary dryer is preferred.

It is preferred to then marumerize the pelletized extruded metal oxide particles as this has been found to increase the hardness, abrasion as measured by the percentage of fines in the treated pelletized extruded metal oxide. Any of a variety of marumerizers may be used in the present invention. Rotary drying may eliminate the need for a marumerizer.

Once the pelletized extruded metal oxide particles have been formed, they should be placed in a reactor vessel so as to be contacted with fluids contaminated with sulfur compounds. The fluids will include gas, liquid, and combinations thereof. It is most preferred to remove sulfur compounds from contaminated gas streams, such as propane and hydrocarbon gases. Among the sulfur compounds that can be removed using the present metal oxide particles are hydrogen sulfide ($H_2S$), carbonyl sulfide (COS), carbon disulfide ($CS_2$), Dimethyl Sulfide (DMS), and mercaptans, such as Methyl Mercaptan (MeSH), Ethyl Mercaptan (EtSH), and Propyl Mercaptan (PrSH). It should be noted that it is likely that other contaminants found in fluids, especially hydrocarbon gas, can be removed by the compressed metal oxide particles. These sulfur compounds can be removed under ambient conditions, more particularly, when the temperature is equal to or less than 70° C., with 200° C. being the highest temperature. Any pressure can be used, with ambient pressure preferred. Additionally, the fluid stream can be passed over the metal oxide particles at a velocity equal to at least 0.6 feet per minute, in gases and 0.1 feet per minute for liquids.

The compressed metal oxide particles can retain an average amount of sulfur equal to at least 10%, and preferably 30%, by weight of the bound metal oxide particles and have an $H_2S$ holding capacity equal to at least 0.27 pounds of $H_2S$ per pound of metal oxide product. Also, the metal oxide particles should have a density ranging between 1.0 and 1.5. From this, it can be concluded that the pelletized extruded metal oxide product has increased sulfur holding capacity.

The following examples are for illustrative purposes only and are not meant to limit the claims in any way.

EXAMPLES

Example 1

A test was conducted to determine the effectiveness of extruded pelletized iron oxide in removing sulfur species contaminants, including hydrogen sulfide, carbonyl sulfide, mercaptans, and possibly carbon disulfide. The test was initiated by packing a 2 inch by 12 inch column with approximately 1.25 pounds, or approximately 10 inches, of pelletized iron oxide media. The iron oxide pellets were comprised of black iron oxide and a starch binder. An inlet valve was located at the bottom of the column so that contaminated liquid entered the column at the bottom and exited the top of the column. The gas to be purified was liquid propane contaminated with various sulfur species contaminants, including hydrogen sulfide, carbonyl sulfide, and light mercaptans. Measurements to determine the amount of sulfur contaminants were made when the gas entered the column and when the gas exited the column, with measurements taken at different times. FIG. 1 shows the initial amounts of various sulfur compounds entering the column. The contaminants were measured in parts per million by weight, or PPMW. The specific conditions in the reactor or column are listed below as follows:

| | |
|---|---|
| Type of Treater | Single, Verticle |
| Treater Temp | 65° F. |
| L/D Ratio | 5:1 |
| Sample Pressure | 360 PSIG |
| Flow Direction | Up Flow |
| Contact Time | 15 mLs/min |
| CEP-1 | FM1 Extrusion |

L/D stands for Dieway length/Diameter in the die of the extruder.

The sulfur contaminants were detected by using a copper strip test, which identified the amount of sulfur and contaminants in the liquid stream, by its corrosivity to polish copper strips by ASTM method D-1838.

As can be seen from FIG. 1, the pelletized iron oxide resulted in excellent removal of various sulfur compounds. In particular, $H_2S$ was readily removed by the pelletized iron oxide. Additionally, COS, $CS_2$, and mercaptans were readily removed. Thus, it was concluded that the pelletized iron oxide provided for excellent removal of sulfur compounds. This was considered important because it was known that previous iron oxide pellets did not sufficiently remove sulfur, as compared to iron oxide on a carrier.

Example 2

The same procedure as Example 1 was followed except pelletized zinc oxide was tested instead of pelletized iron oxide. The conditions were as follows:

| | |
|---|---|
| Type of Treater | Single, Verticle |
| Treater Temp | 65° F. |
| L/D Ratio | 5:1 |
| Sample Pressure | 360 PSIG |
| Flow Direction | Up Flow |
| Contact Time | 11 mLs/min |
| CEP-1 | 2.0 extrusion |

The results of the test are disclosed in FIG. 2. It was observed that the pelletized zinc oxide, in general, removed most sulfur compounds except COS. Use of the pelletized zinc oxide resulted in suitable elimination of most sulfur compounds. This was considered important because normally zinc oxide suitably eliminates sulfur contaminants at higher temperatures. At ambient conditions, zinc oxide will typically hold between 3% and 8% total sulfur.

Example 3

Tests were conducted to determine the relative crush strength of pelletized iron oxide particles. Three types of iron oxide known as FM1 (Ferrimagnetic 1), FM2 (Ferrimagnetic 2), and Hoover were pelletized, with all three types of iron oxide being a similar black iron oxides. The FM1 and FM2 iron oxides are ferrimagnetic porous iron oxide particles believed to range in size from 1.5 microns to 50 microns, with a hypothesized surface area of 10 $m^2/gm$. The Hoover oxide is believed to be a much smaller grade material with little or no porosity. The iron oxide was blended with various types of binders, with the binders mixed in different amounts in solution. Also, various extruder die lengths were used. These variations were made to determine what combination would result in iron oxide particles having sufficient crush strength. A pelleting press manufactured by Kahl was used to form all the iron oxide pellets, with the pellets formed from the press having a diameter of 6 mm. To assess the strength of each pellet, a Kahl Pellet Hardness Tester was used. In order to derive accurate data, tests were made on ten pellets manufactured according to each method, with the results then averaged. The Kahl pellet tester is manufactured by Amandus Kahl Gmblt & Co., Hamburg, Germany. The following table shows the results of the tests, the particular type of binder for use in forming each of the pellets, the die length used to form the pellets, and the average crush strength.

TABLE I

LCI TEST SUMMARY

| Oxide | Water % | Binder* | Dieway Length | Strength kg | Density | Fines |
|---|---|---|---|---|---|---|
| FM1 | 18.2 | None | 18 | Weak | 1.690 | |
| FM1 | 15 | None | 18 | Weak | 1.448 | |
| FM1 | 15 | 0.0075% CMC | 18 | Weak | 1.406 | |
| FM1 | 15 | None | 36 | Weak | 1.477 | |
| FM1 | 12 | 0.0075% CMC | 36 | Weak | 1.542 | |
| FM1 | 13 | 0.0075% CMC | 36 | Weak | 1.508 | |
| FM1 | 13 | 0.0075% CMC | 48 | Weak | 1.475 | |
| FM1 | 13 | 0.0075% CMC | 60 | Weak | 1.454 | |
| FM1 | 13 | 0.64% Starch | 30 | Fragile | 1.359 | |
| FM1 | 16 | 0.78% Starch | 30 | Firm | — | |
| FM1 | 17 | 0.84% Starch | 30 | 3.8 | — | |
| FM1 | 15 | 12.5% Bentonite | 30 | 4.3 | 1.542 | |
| Hoover | 17 | 1.0% Starch | 30 | 5.1 | — | |
| FM2 | 17 | 1.0% Starch | 30 | 1.6 | — | |
| FM1 | 19.2 | 1.34% Starch | 60 | — | — | |
| FM1 | 17.3 | 1.33% Starch | 60 | 5.1 | — | |
| FM1 | 17.2 | 1.33% Starch | 60 | 5.98 | — | |
| FM2 | 15.3 | 1.04% Starch | 60 | 3.1 | 1.33 | 15.1 |
| FM2 | 15.3 | 1.04% Starch | 60 | 1.9 | 1.45 | 7.6 |
| FM2 | 18.8 | 2.36% Starch | 60 | 6.65 | 1.17 | 5.3 |
| FM2 | 18.8 | 2.36% Starch | 60 | 4.7 | 1.46 | 2.4 |
| FM2 | 18.9 | 2.34% Starch | 48 | 7.65 | 1.03 | 3.2 |
| FM2 | 18.9 | 2.34% Starch | 48 | 8.3 | 1.32 | 1.3 |
| FM2 | 18.9 | 2.34% Starch | 48 | 6.8 | 1.23 | 1.8 |
| FM2 | 18.9 | 2.34% Starch | 36 | 6.0 | 1.06 | 2.1 |
| FM2 | 18.9 | 2.34% Starch | 36 | 6.05 | 1.23 | 1.7 |

*Binder % on basis of dry weight oxide

The binder listing is the percentage of starch on a dry weight basis found in the pellets. The percent water represents the amount of binder and water solution mixed with the metal oxide material. The density of the pellets appears to be unrelated to the crush strength of the pellets.

As can be seen from the data, the use of starch and bentonite provided for excellent crush strength in the pellets formed therefrom. Carboxymethylcellulose resulted in a pellet having insufficient crush strength. Additionally, it was determined that a die length of at least 30 mm was preferred.

Example 4

The present Example relates to testing the pelletized FM1, FM2, and Hoover iron oxides to evaluate the reactivity and efficiency of each composition in removing hydrogen sulfide from gas. Three reactor beds were filled with the three different types of iron oxide. Two pounds of the pelletized iron oxide material was placed in a 4-foot glass reactor bed tube. This step was repeated for each test composition listed in Table 2. A sour gas stream containing 3,000 parts per million by weight (ppm) of $H_2S$ was passed over the various pelletized iron oxide compositions. Specifically, the gas was passed over the FM2 bed once, the FM1 bed three times, and the Hoover bed three times, all of which are listed in the chart below. The flow rate of the contaminated gas (Q) was set at one of three different rates: 2.09 liters per minute (L/min), 3.75 L/min, or 5.09 L/min. The outlet $H_2S$ was recorded as a function of time of the varying flow rates.

Figure 6:
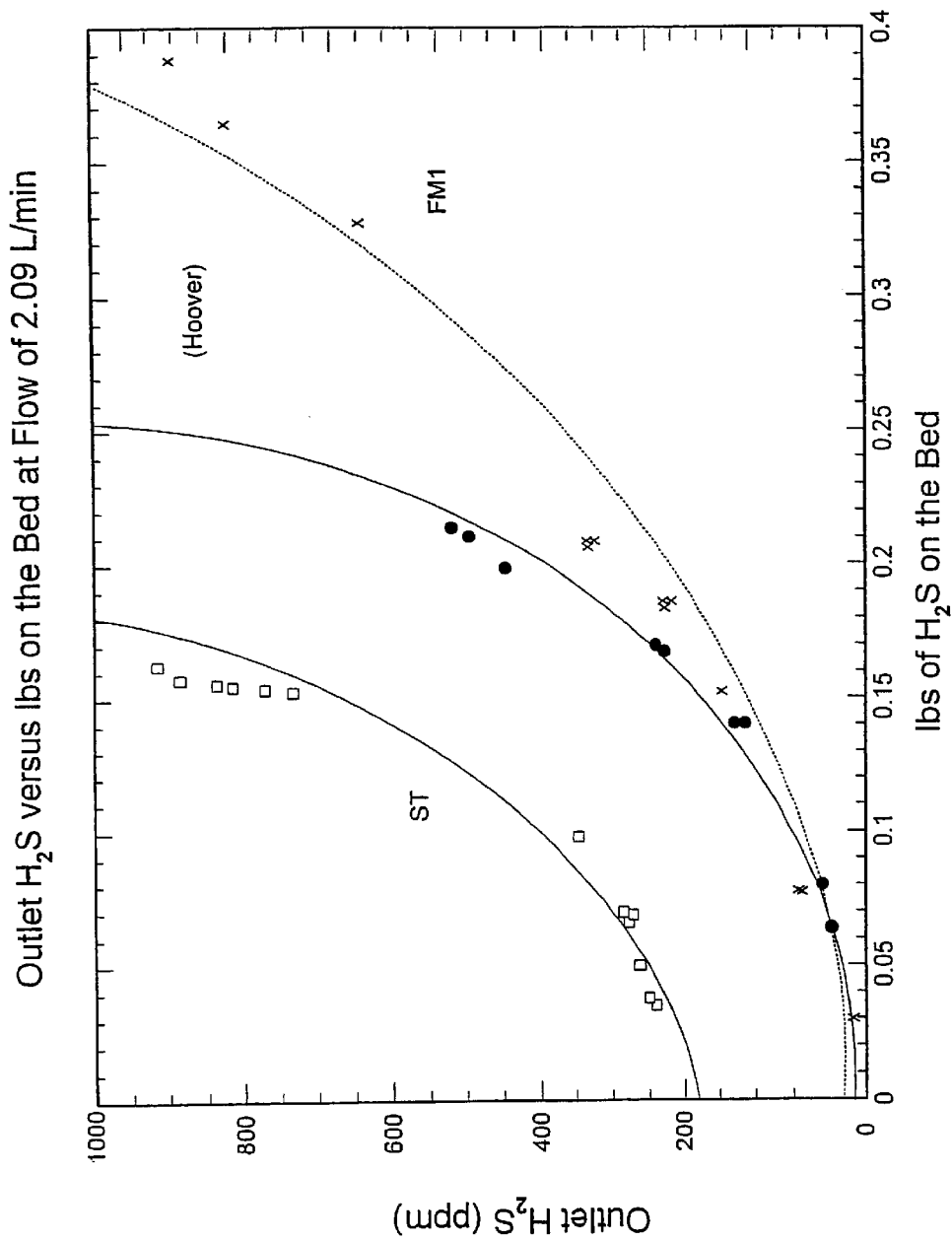
FIG. 6 discloses a comparison between non-pelletized iron oxide and two types of pelletized iron oxide, whereby outlet $H_2S$ is related to the pounds of $H_2S$ on the oxide bed; and, FIG. 7 relates to the same thing as in FIG. 6, except it compares three different types of pelletized iron oxide.
Figure 7:
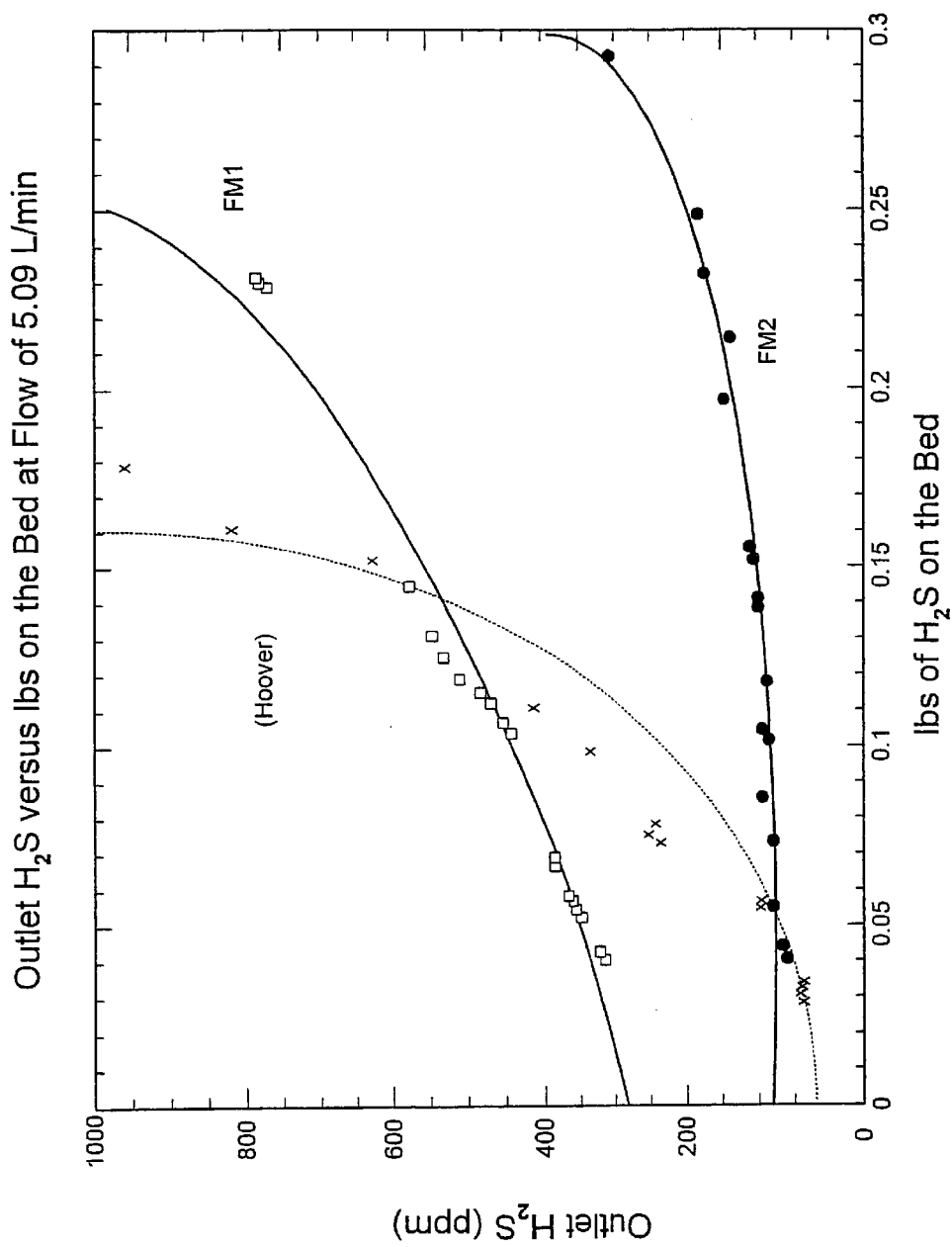

FIG. 6 shows how much $H_2S$ was held on the Hoover and FM1 types of iron oxide at flow rate of 2.09 L/min before break-through of $H_2S$ occurred. Additionally, FIG. 6 shows how much sulfur was held on the same type of iron oxide used to form the FM1 composition, but with the iron oxide located on a carrier. As can be seen, the pelletized iron oxide held significantly more sulfur. In FIG. 7, the same thing as FIG. 6 was shown, except a different flow rate, 5.09 L/min, was used. The system was pressurized at 6 PSIG, and the sour gas had a temperature of 68° F. The $H_2S$ was measured using an industrial scientific TMX 412 electronic gas analyzer, calibrated with a standard 124 parts per million $H_2S$ in tube mixture. Also, a Kitagawa tube was used as a cross check to confirm the $H_2S$ levels.

Figure 4:
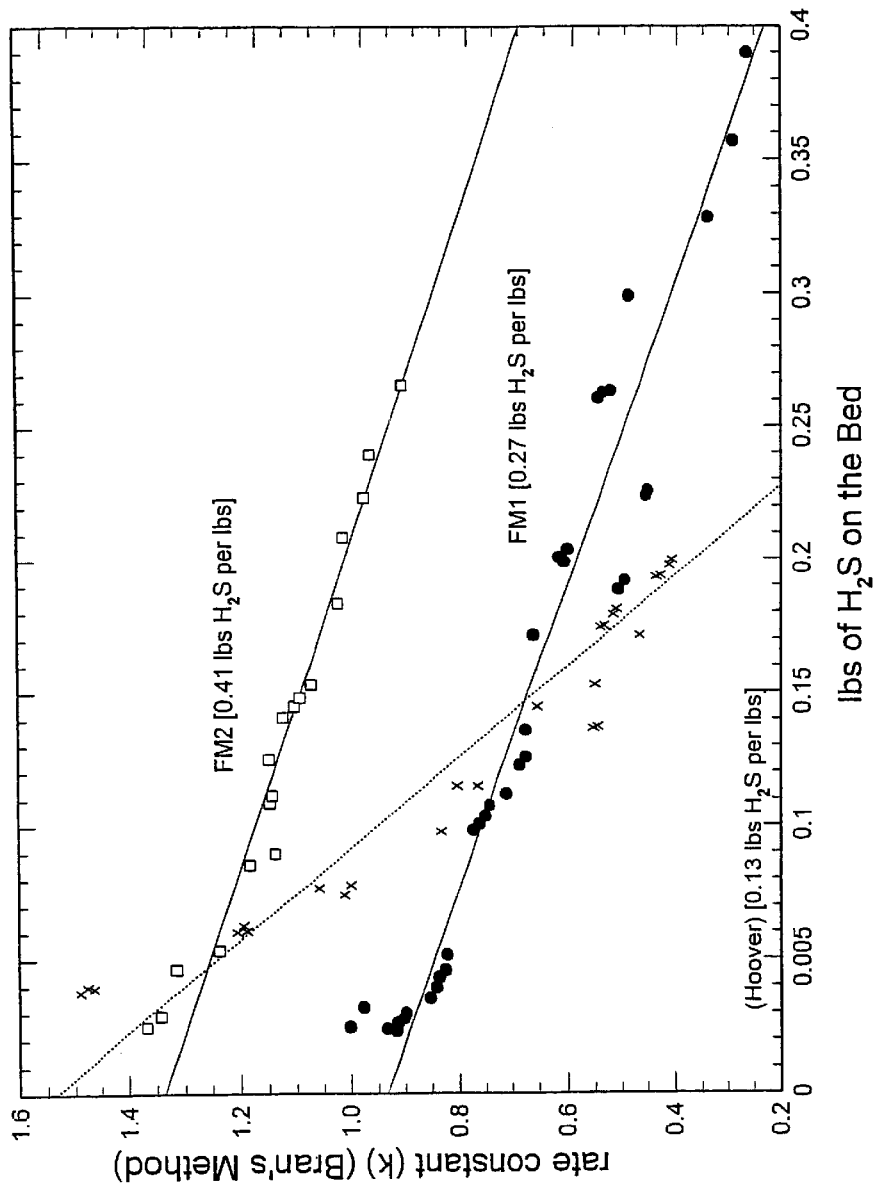
FIG. 4 describes the same thing as in FIG. 3, except it compares three different types of iron oxide.
Figure 5:
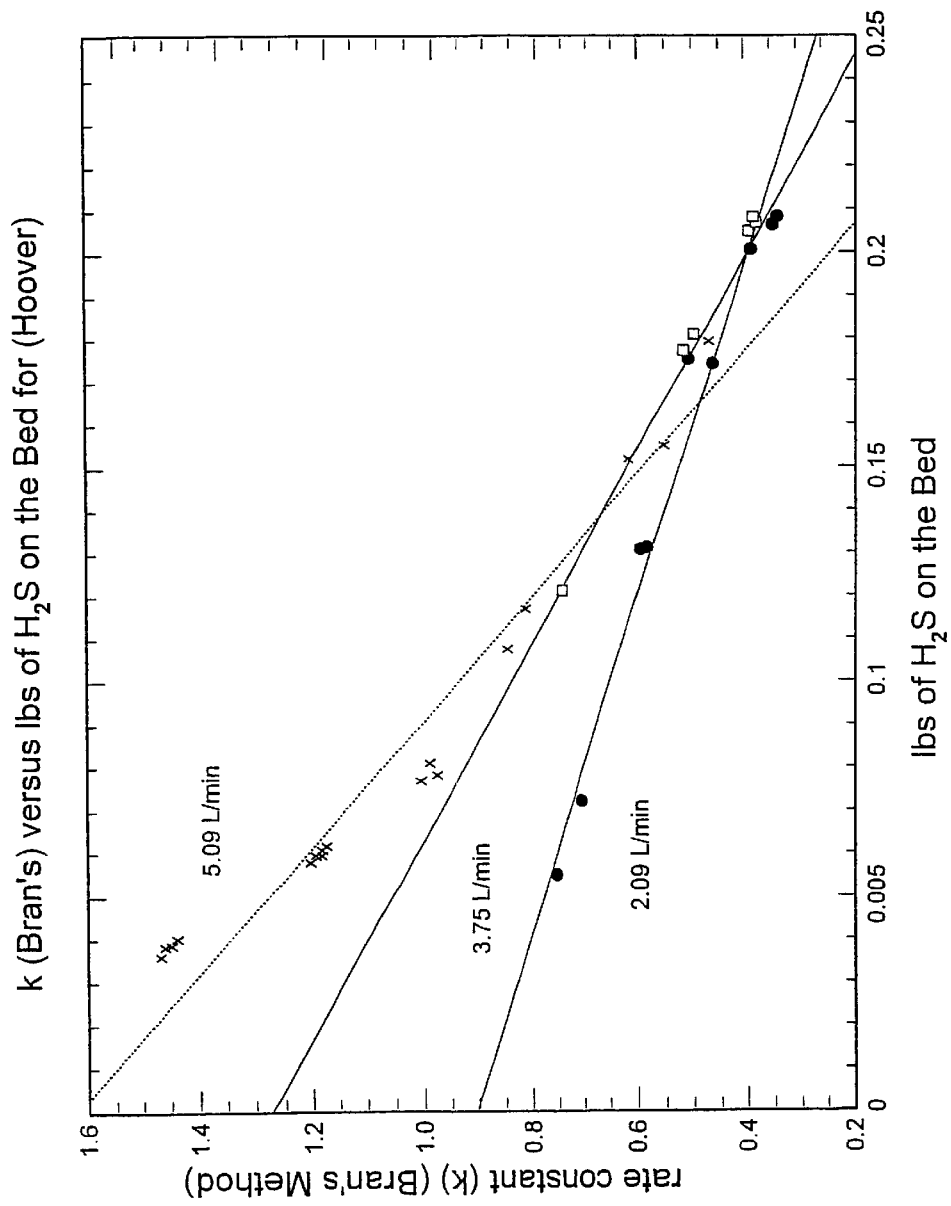
FIG. 5 describes the same thing as FIG. 3, except it relates to a different type of iron oxide.

The rate constants (k) were calculated from a determination of the outlet $H_2S$, with the outlet $H_2S$ (lbs.) equation as follows: $\Sigma[H_2S$ reacted over $\Delta t$ (lbs.)]. FIG. 3 plots the rate constant versus the pounds of $H_2S$ on the bed for FM1 oxide material. Three different flow rates were used. The (Bran's) constant k was highest at the fastest flow rate of 5.09 L/min. The slope of the curve equates to the rate of reactivity over time. The steeper the curve, the faster the reactivity will be reduced. Thus the slope of the lines in FIGS. 3, 4, and 5 indicate reactivity. FIG. 5 shows the same thing as FIG. 3, except the iron oxide was the Hoover species. FIG. 4 relates to the same data as in FIG. 3, except three different types of iron oxides were tested.

The FM2 had the highest rate of reactivity, followed by the FM1. Both compositions showed excellent reactivity. The Hoover material was observed to be not as good a candidate for use as the other two materials. From the k determination, the estimated per pound capacity for holding $H_2S$ by the oxide was determined using linear regression analysis of a plot of k versus lbs. of total $H_2S$ on the bed. The estimated capacity is listed below. Further, the slope of the linear regression analysis relates to the speed of reaction between the oxide material and the $H_2S$, this is R. The x intercept of the plots gave the overall capacity of the materials. The results are summarized as follows:

TABLE 2

LINEAR REGRESSION ANALYSIS OF K VS. ACCUMULATED LBS OF REACTED $H_2S$ WITH THE BED

| Material | Q (L/min) | Slope | Est. Capacity per Pound | k range | R |
|---|---|---|---|---|---|
| LCI (FM2) | 5.09 | −1.6 | 0.41 | 1.35–1.15 | 0.976 |
| LCI (FM1) | 2.09 | −1.2 | 0.30 | 0.70–0.56 | 0.992 |
| LCI (FM1) | 3.75 | −1.5 | 0.30 | 0.94–0.72 | 0.998 |
| LCI (FM1) | 5.09 | −1.4 | 0.31 | 0.92–0.70 | 0.975 |

TABLE 2-continued

LINEAR REGRESSION ANALYSIS OF K VS.
ACCUMULATED LBS OF REACTED H$_2$S WITH THE BED

| Material | Q (L/min) | Slope | Est. Capacity per Pound | k range | R |
|---|---|---|---|---|---|
| LCI (FM1) All data | — | -1.7 | 0.27 | 0.94–0.70 | 0.959 |
| LCI (Hoover) | 2.09 | -2.6 | 0.17 | 1.72–0.69 | 0.982 |
| LCI (Hoover) | 3.75 | -4.3 | 0.15 | 1.28–0.72 | 0.998 |
| LCI (Hoover) | 5.09 | -6.9 | 0.12 | 0.90–0.58 | 0.992 |
| LCI (Hoover) all data | — | -5.8 | 0.13 | 1.58–0.67 | 0.984 |

As can be seen, the FM2 and FM1 had superior results for holding an amount of H$_2$S per pound of iron oxide (see Est. Capacity per Pound).

Example 5

The reaction rate k, from Example 4, was analyzed to determine whether the pelletized iron oxide had a better reaction efficiency than non-pelletized iron oxide. FIG. 6 is a combined plot of outlet H$_2$S readings (PPM) v. pounds of H$_2$S that has reacted with a bed of pelletized material, either the (FM1), (Hoover), or non-pelletized iron oxide materials, at a flow rate of 2.09 L/min. These curves relate to the outlet readings of H$_2$S (PPM) to the amount of reacted H$_2$S with the bed, and directly illustrates the reactive speed of the materials.

As can be seen FIG. 6, two pounds of FM1 product reacted with 0.38 pounds of H$_2$S before the outlet H$_2$S reached 900 parts per million. This is compared with non-pelletized iron oxide, which had only 0.15 pounds of iron oxide reacted before the H$_2$S reached a level of 900 parts per million at the outlet. This shows that the pelletized iron oxide gives a superior result and reacts with a greater amount of H$_2$S than non-pelletized iron oxide.

Example 6

The present Example compared pelletized zinc oxide with SULFATREAT® (iron oxide on a montmorillonite carrier). The conditions and results are as follows:

|  | ZnO | Sulfa Treat |
|---|---|---|
| Bed Height | 2.0 ft | 2.0 ft |
| Pressure | 5 psig. | 5 psig. |
| Flow Rate | 270 cc/min. | 270 cc/min. |
| Temp | 70° F. | 70° F. |
| Inlet Conc. | 3000 + ppm H$_2$S in N$_2$ | 3000 ppm H$_2$S |
| Diameter | 1.5 in. | 1.5 in. |
| Weight | 1065 gms | 827 gms |
| Volume | 815 mL | 815 mL |
| Total gas used | 12830 L | 14774 L |
| Total H$_2$S removed | 38.5 L | 44.3 L |
| Days to Breakthrough | 33 | 38 |

The ZnO ran for 33 days before hydrogen sulfide broke through. This is 5 days shorter than SulfaTreat ran at the same conditions. Although the ZnO did not remove as much sulfur as SulfaTreat, the results are positive. ZnO is mainly used at elevated temperatures and this test was run at room temperature and still removed H$_2$S.

Example 7

The present Example relates to the preparation of exemplary metal oxide pellets used in the removal of sulfur from fluids. The method was initiated by obtaining a sample of black iron oxide from the Ironrite Products Company, Inc. of St. Louis, Mo. The black iron oxide was analyzed and determined to contain an amount of moisture equal to 3% by weight. Additionally, it was determined that the black iron oxide had a bulk density of 1.558 kg/L.

To form the metal oxide pellets, 9,000 gms of the black iron oxide placed in a bladekneader, manufactured by Sigma Corporation, St. Louis, Mo. To the black iron oxide, an amount of binder solution was added. The binder solution was formed by mixing 118 gms of starch manufactured by Argo to boiling water. Starch was measured so that it was equal to 1.34% by weight starch on a dry weight basis, so that the total binder solution added to the black iron oxide was equal to 17.2% by weight. This formed a binder and iron oxide composition, which was then kneaded in the bladekneader for 5 minutes. A dough was produced that was slightly wet and sticky.

The iron oxide dough was then fed into a pellet press, Model 14-175 (manufactured by Kohl). The pellet press operated at 100 rpm and was equipped with a 6 mm die, having a 60 mm pressway length. The energy input for the pellet press was equal to about 1.51 kw, and the extrusion rate was equal to 224 kg per hour.

After extrusion, the pellets were processed in a marumerizer (made by LCI Corporation, Charlotte, N.C.), with an 8 mm friction plate turning at 300 rpm for 10 seconds. The pellets were then oven dried at a temperature of about 200° F., and it was determined that the pellets had a bulk density of approximately 1.25 kg/L. Additionally, it was determined that the pellets had a hardness equal to about 6.0 kg.

Example 8

An iron oxide pellet was formed that included a cellulose binder. The process of formation was as follows:
1. In a tank, 64 lbs of water was added to 50 lbs of cellulose and mixed.
2. Next, 1000 lbs of iron oxide with a moisture content of 1% or less was added to the cellulose and water mixture.
3. The constituents were mixed until a homogenous blend was formed.
4. The blend was then pressed at 45,000 psi to form the pellets.

The resultant pellets were of the following composition:

| Component | % By Weight |
|---|---|
| Iron | 89 |
| Cellulose | 5 |
| Water | 6 |

Thus, there has been shown and described a method relating to the use of compressed metal oxide compositions for removing contaminants from fluids and a method for making such compressed metal oxide compositions which fulfill all the objects and advantages sought therefore. It is apparent to those skilled in the art, however, that many changes, variations, modifications, and other uses and applications for the subject compressed metal oxide and methods are possible, and also such changes, variations, modifications, and other uses and applications which do not depart from the spirit and scope of the invention are deemed to be covered by the invention which is limited only by the claims which follow.

What is claimed is:

1. A bound metal oxide composition for removing contaminants from fluids, wherein said bound metal oxide composition consists of:
   a. at least one metal oxide of the formula $Me_xO_y$, with Me selected from the group consisting of periodic table row 4, 5, 6 and 7 metals, with x equal to between 1 and 3, and y equal to between 1 and 4 and hydrated forms of said metal oxide; and,
   b. an organic hydrophobic binder, with said bound metal oxide composition having a crush strength equal to at least 1.0 Kg, said bound metal oxide composition can retain an average amount of contaminant equal to at least 10% by weight of said bound metal oxide composition.

2. The bound metal oxide composition of claim 1 wherein said binder is added to said metal oxide in an amount equal to from about 0.5% to about 20% by weight of said bound metal oxide composition.

3. The bound metal oxide composition of claim 1 wherein said binder is a cellulose composition.

4. The bound metal oxide composition of claim 1 wherein said metal oxide is selected from the group consisting of $Fe_aO_b$, ZnO, hydrated forms of metal oxide, and combinations thereof, with a equal to between 1 and 3, and b equal to between 1 and 4.

5. The bound metal oxide composition of claim 1 wherein said bound metal oxide composition includes an activator of said metal oxide composition, with said activator selected from the group consisting of copper oxide, silver oxide, gold oxide, platinum oxide, cadmium oxide, nickel oxide, palladium oxide, lead oxide, mercury oxide, tin oxide, cobalt oxide, manganese oxide, aluminum oxide, and combinations thereof.

6. The bound metal oxide composition of claim 1 wherein said bound metal oxide has a diameter ranging between 3 mm and 20 mm.

7. The bound metal oxide composition of claim 1 wherein said bound metal oxide is comprised of an amount of $Fe_3O_4$.

8. The bound metal oxide composition of claim 1, wherein said bound metal oxide composition removes sulfur compounds at temperatures of less than 200° C.

9. The bound metal oxide composition of claim 1, wherein said bound metal oxide composition has been extruded to form an extruded metal oxide composition.

10. The bound metal oxide composition of claim 1 wherein said bound metal oxide composition has been pelletized to form a pelletized metal oxide composition.

11. The bound metal oxide composition of claim 1 wherein said bound metal oxide composition removes contaminants from a fluid stream having a velocity equal to at least 0.6 feet/minute for gas and 0.1 feet per minute for liquids.

12. The bound metal oxide composition of claim 1 wherein said bound metal oxide composition has an $H_2S$ holding capacity equal to at least 0.27 pounds of said metal oxide.

13. The bound metal oxide composition of claim 1 wherein said binder absorbs less than 60% by weight water, has a density greater than 70 gm/l, and an aspect ratio ranging between 6 and 7.

14. The bound metal oxide composition of claim 1 wherein said bound metal oxide has a crush strength equal to at least 3.5 Kg.

15. A method for forming a bound metal oxide having a crush strength of at least 1.0 Kg, a diameter ranging between about 3 mm and 20 mm, and capable of holding an amount of contaminant equal to at least 10% by weight of said metal oxide, said method consisting of:
   a. mixing an amount of metal oxide having a particle size ranging between 0.1 microns and 100 microns and of the formula $Me_xO_y$ with an amount of organic hydrophobic binder to form a metal oxide mixture, wherein Me is selected from the group consisting of periodic table row 4, 5, 6 or 7 metals, x is equal to between 1 and 3, and y is equal to between 1 and 4 and hydrated forms of said metal oxide; and
   b. compressing said metal oxide mixture to produce said bound metal oxide.

16. The method of claim 15 wherein said compressing step is achieved by passing said metal oxide mixture through an extruder having a die length of at least 15 mm, and a diameter of at least 3 mm, producing an extruded metal oxide.

17. The method of claim 16 wherein said extruded metal oxide is cut to form a pelletized extruded metal oxide.

18. The method of claim 17 wherein said pelletized extruded metal oxide is marumerized.

19. The method of claim 18 wherein said pelletized extruded metal oxide is dried at a temperature ranging between ambient and less than 150° C.

20. The method of claim 19 wherein said method includes drying said pelletized extruded metal oxide in a dryer selected from the group consisting of a belt dryer and a rotary dryer.

21. The method of claim 15 wherein said metal oxide has a particle size ranging between about 1.5 microns and 50 microns.

* * * * *